March 13, 1945.  A. T. NEWELL  2,371,585
HIGH PRESSURE VALVE
Filed March 7, 1944
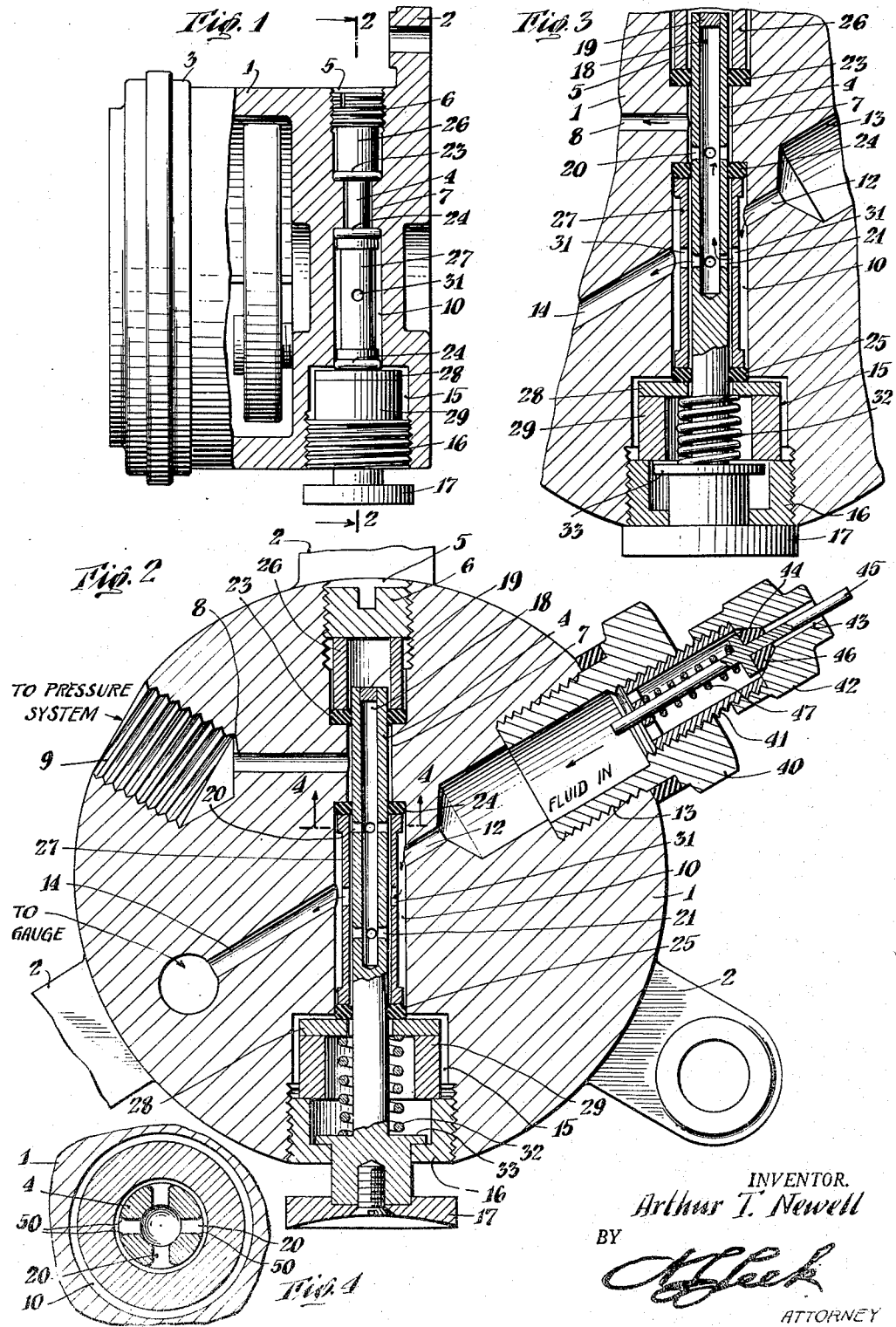
INVENTOR.
Arthur T. Newell
BY
ATTORNEY Patented Mar. 13, 1945

2,371,585

UNITED STATES PATENT OFFICE 2,371,585

HIGH-PRESSURE VALVE

Arthur T. Newell, Huntington, N. Y., assignor to Kenyon Instrument Co., Inc., Huntington Station, Long Island, N. Y., a corporation of New York Application March 7, 1944, Serial No. 525,339

1 Claim. (Cl. 251—78)

This invention relates to fluid valves and has for its object to provide a novel and improved device of this type which may be employed in high pressure systems but may nevertheless be operated without difficulty by the hand or finger.

Another object of the invention is to provide a sliding or plunger valve for the above purpose which is effectively sealed against leakage and which embodies various other novel and improved details of construction and features of operation.

Other objects and advantages will be apparent as the nature of the invention is more fully disclosed.

It is a common practice to use piston or poppet-type valves to control air or hydraulic systems, but it is impossible to employ ordinary hand-operated valves of this type in high pressure systems (1500 to 2000 pounds per sq. in.) because the moment the valve is open to the force of the high pressure medium this force is effective against the piston or push-rod, and, even when the valve parts are very small, the force is of such magnitude as to make it impossible to hold by the pressure of the thumb or finger.

The present invention provides an improved sliding type of valve, without any piston effect, which may be used to advantage in high pressure fluid lines and may easily be operated by the finger.

One important problem incident to the construction of such a valve is the adequate sealing of the sliding element, ordinary packing glands being unsatisfactory because they would have to be drawn up so tightly that considerable force would be required to move the slide. My invention solves this problem by employing a special combination of pliable toroid packings, commonly called "O" rings, which divide the valve cylinder into separate chambers and effectively seal these chambers against leakage. This feature, and other refinements hereinafter described, simplify the construction and operation of the valve and enable it to be confined in a small compact unit with a minimum number of parts.

Although the novel features which are characteristic of this invention are set forth more in detail in the claim appended hereto, the nature and scope of the invention may be better understood by referring to the following description, taken in connection with the accompanying drawing forming a part thereof, in which a specific embodiment has been set forth for purposes of illustration.

In the drawing:

Fig. 1 is a side view, partly in section, showing a valve embodying the invention, in association with a suitable pressure gauge;

Fig. 2 is a vertical section through the valve, taken on line 2—2 of Fig. 1, showing the valve slide in its open or retracted position;

Fig. 3 is a broken sectional view similar to Fig. 2 but with the valve slide depressed; and Fig. 4 is an enlarged section taken on the line 4—4 of Fig. 2.

In the following description certain specific terms are used for convenience in referring to the various details of the invention. These terms, however, are to be interpreted as broadly as the state of the art will permit.

The drawing shows a valve block 1 having attaching lugs 2 and a suitable pressure gauge 3. The gauge 3 forms no part of the present invention, so it will not be described in detail.

The valve slide 4, hereinafter more fully described, is mounted in a cylindrical bore of varying cross-section which is drilled diametrically through the valve block 1 and includes an end chamber 5 sealed by plug 6, an intermediate chamber 7 of reduced cross-section connected by duct 8 and socket 9 to any desired pressure system, such as a bell maintained under high pressure, a chamber 10 connected by duct 12 and socket 13 to any suitable source of high pressure fluid and connected by duct 14 to the gauge 3, and an end chamber 15 containing a plug 16 in which the push button or finger-piece 17 of slide 4 is journalled.

The socket 13 is closed by a cap 40 having a threaded bore carrying a valve housing 41 having a cap 42 provided with an axial bore 43 registering with a valve seat 44. A valve stem 45 carrying a valve 46 is seated against the seat 44 by a spring 47, the construction being similar to that of a standard tire valve which is normally closed but is opened in response to external pressure when an air hose is connected thereto.

The valve slide 4 is a small cylindrical rod which is drilled through the greater part of its length with an axial bore 18 forming a tube, the outer end of which is sealed by a plug 19. Two spaced series of valve ports 20 and 21, respectively, are drilled diametrically through the tubular portion of slide 4, as shown in Figs. 2 and 3. The slide 4 is then inserted in the cylindrical bore of valve block 1 and sealed therein by means of three toroid or doughnut-shaped packing rings 23, 24 and 25, in a manner which will now be described.

The toroid packings 23, 24 and 25 may be of identical dimensions and may be composed of rubber or any other suitable flexible material. The uppermost packing ring 23, as viewed in the drawing, is seated on the inner ledge of the end chamber 5 and is secured in place by a collar 26 which is forced against said ring by tightening the plug 6. The rings 24 and 25 are clamped against opposite ends of the chamber 10 by a spool-shaped valve sleeve 27, the ring 25 being seated on a gasket 28, which is secured in place by tightening the plug 16 against a collar 29.

The body portion of the spool-shaped sleeve 27 is smaller in diameter than the chamber 10 in which said sleeve is mounted, hence when air, oil or other fluid under pressure is admitted to chamber 10 through duct 12 it will pass through the duct 14 to the gauge 3 which will indicate the pressure of the fluid in a manner well understood in the art. The sleeve 27 has a port 31 drilled diametrically therethrough so that the fluid will also pass around the slide 4 and through the ports 21 into the tubular bore 18 of the slide 4.

The slide 4 is normally held in its outer or closed position by means of a spring 32 which is compressed between the gasket 28 and an inner flange 33 of finger-piece 17. In this outermost position of slide 4 the flange 33 of the finger-piece engages the inner face of plug 16; and, although the fluid entering chamber 10 from duct 12 will pass freely through duct 14 to the gauge 3, the toroid ring packings prevent the fluid from leaking through to the chamber 7. This is the position of the parts in Fig. 2.

However, when the finger-piece 17 is depressed to the inner limit of its travel, which is reached when flange 33 engages the edge of collar 29 as shown in Fig. 3, the valve port 20 will pass through the packing member 24 into chamber 7 which communicates with the duct 8 leading to the pressure system so that the high pressure fluid will pass between chamber 10 and the pressure system. Hence, if the valve 46 is closed the gauge will register the pressure in the system and if pressure is supplied to the socket 13 and valve 46 from an external source such as a compressed air hose, the fluid will pass into the pressure system through the passage 8 until the slide 4 is released.

The toroid packings together render fluid-tight the two axially aligned chambers 7 and 10 between which the valve action is desired. The packings 23 and 24 seal the two ends of chamber 7; while the packings 24 and 25 seal the two ends of chamber 10 and prevent the high pressure fluid from passing either directly from the top of chamber 10 into chamber 7 or from the bottom of chamber 10 into the space between plunger 4 and sleeve 27 to chamber 7.

The moving shaft tends to rotate the packing ring. This rotational effect moves the ring against one side causing it to more tightly seal in its retaining groove. It will be further appreciated that the groove need not be too tight a fit to insure a satisfactory seal. However, the ring may be placed in a groove and then compressed, as shown in the drawing. There being no sharp or cut edges on the ring, it represents a smooth line seal with the shaft.

The orifices comprising the valve port 20, which pass through the packing ring 24 during the sliding movement of the plunger 4 are countersunk or chamfered as shown at 50 to avoid all possibility of the edges of the slide around these orifices cutting or wearing a notch in the packing ring even after long periods of use. They are also of small diameter in relation to slide 4 so as to avoid distortion of the packing as they pass the same.

The toroid sealing rings may be mounted either on the plunger or in the housing, preferably in positioning grooves and have been shown by way of example as secured in the housing.

Although a specific embodiment of the invention has been shown for purposes of illustration, it is to be understood that the invention is capable of various modifications and adaptations which will be readily apparent to a person skilled in the art. The invention is only to be limited in accordance with the scope of the appended claim.

What is claimed is:

A valve for controlling the flow of high pressure fluid, comprising a housing having a pair of cylindrical bores of different diameters in axial alignment, a tubular plunger loosely fitting in said bores and having an axial passage closed at both ends, a spool shaped sleeve in the larger diameter bore around said plunger forming an annular chamber in said bore, a pair of ducts communicating with said annular chamber for connection to a pressure gauge and a fluid supply source respectively, flexible toroid packing rings around said plunger in the larger diameter bore clamped between the ends of said sleeve and the ends of said bore to seal said annular chamber, a third toroid packing ring around said plunger sealing the end of said smaller diameter bore to form a second annular chamber, a duct communicating with said second chamber for connection to a pressure system, a radial passage in said sleeve, a radial passage in said plunger registering with said sleeve passage to supply fluid to said axial passage when said plunger is in open position, a second radial passage in said plunger in said second chamber when said plunger is in open position to supply fluid to said second chamber and registering with said sleeve when said plunger is in closed position, spring means normally holding said plunger in closed position and a finger-piece on said plunger to be depressed for shifting said plunger to open position to register the system pressure on said gauge.

ARTHUR T. NEWELL.